United States Patent
Roth et al.

(10) Patent No.: US 10,913,617 B1
(45) Date of Patent: Feb. 9, 2021

(54) CONVEYOR WITH GUIDE RAILS TO SUPPORT A DIVERT UNIT

(71) Applicant: INTELLIGRATED HEADQUARTERS, LLC, Mason, OH (US)

(72) Inventors: Eric Roth, West Chester, OH (US); Timothy A. Koeninger, Alexandria, KY (US); William M. Saurber, III, Hamilton, OH (US); Jacob Wieneke, Liberty Township, OH (US); Anthony J. Turco, Liberty Township, OH (US)

(73) Assignee: Intelligrated Headquarters, LLC, Mason, OH (US)

(*) Notice: Subject to any disclaimer, the term of this patent is extended or adjusted under 35 U.S.C. 154(b) by 0 days.

(21) Appl. No.: 16/672,979

(22) Filed: Nov. 4, 2019

(51) Int. Cl.
*B65G 47/84* (2006.01)
*B65G 21/10* (2006.01)

(52) U.S. Cl.
CPC .......... *B65G 47/844* (2013.01); *B65G 21/10* (2013.01); *B65G 2207/36* (2013.01)

(58) Field of Classification Search
CPC ... B65G 21/10; B65G 47/844; B65G 2207/36
See application file for complete search history.

(56) References Cited

U.S. PATENT DOCUMENTS

| | | | |
|---|---|---|---|
| 3,987,888 A * | 10/1976 | Wickam | B65G 17/005 198/802 |
| 5,135,100 A | 8/1992 | Cotter et al. | |
| 5,732,814 A * | 3/1998 | Owczarzak | B65G 47/844 198/370.02 |
| 6,283,271 B1 | 9/2001 | van den Goor | |
| 7,516,835 B2 | 4/2009 | Neiser | |
| 7,530,441 B2 * | 5/2009 | Zimmer | B65G 47/844 198/370.02 |

(Continued)

FOREIGN PATENT DOCUMENTS

EP 2634119 B1 9/2013

OTHER PUBLICATIONS

Material Handling and Logistics, Whispersort, [article, online], 2006, [retrieved Feb. 5, 2020], retrieved from the Internet <URL: https://www.mhlnews.com/archive/article/22048193/whispersort> (4 pages).

*Primary Examiner* — Gene O Crawford
*Assistant Examiner* — Keith R Campbell
(74) *Attorney, Agent, or Firm* — Alston & Bird LLP (57) ABSTRACT

A conveyor that includes a conveyor frame, a first guide rail assembly, a divert unit having a switch assembly, and an alignment key is described. In this regard, the first guide rail assembly is positioned on a first portion of the conveyor frame such that rails of the first guide rail assembly extends along a length of the conveyor. In some examples, the first guide rail includes a first guide rail and a second guide rail positioned parallel to the first guide rail. Further, the first guide rail defines a groove along a length of the first guide rail assembly. Furthermore, according to some examples, the switch assembly defines a key slot. The key slot is adapted to enable the alignment key to pass through the key slot and further into the groove of the first guide rail, thereby, aligning the switch assembly on the first guide rail.

20 Claims, 8 Drawing Sheets

(56) References Cited

U.S. PATENT DOCUMENTS

| | | | | |
|---|---|---|---|---|
| 8,069,969 B2* | 12/2011 | Vlug | ............ | E04D 3/38 |
| | | | | 198/370.02 |
| 8,727,096 B2* | 5/2014 | Schroader | ............ | B65G 47/844 |
| | | | | 198/370.01 |
| 9,038,809 B2* | 5/2015 | Wilkins | ............ | B65G 47/46 |
| | | | | 198/370.02 |

* cited by examiner

CONVEYOR WITH GUIDE RAILS TO SUPPORT A DIVERT UNIT

TECHNOLOGICAL FIELD

Example embodiments described herein relate generally to a conveyor for diverting articles to a divert location from the sortation conveyor, and, more particularly, to the conveyor having guide rails to support a divert unit.

BACKGROUND

Generally, in material handling environments like, but not limited to, distribution centers, warehouses, inventories, or shipping centers, a material handling system can convey, handle, sort, and organize various type of articles (e.g. items, cartons, cases, containers, shipment boxes, totes, packages, and/or the like) at high speeds on a conveyor.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to a conveyor and a divert unit of the conveyor. The conveyor can comprise a conveyor frame, a first guide rail assembly, an alignment key, and a divert unit. In some examples, the first guide rail assembly can be configured to be positioned on a first portion of the conveyor frame such that rails of the first guide rail assembly extends along a length of the conveyor. Further, according to some examples, the first guide rail assembly can comprise (i) a first guide rail that can define a groove along a length of the first guide rail assembly and (ii) a second guide rail that can be positioned parallel to the first guide rail. Further, according to some example embodiments, the divert unit can comprise a switch assembly that can define a key slot. The key slot can be adapted to enable the alignment key to pass through into the groove of the first guide rail, thereby, aligning the switch assembly on the first guide rail.

According to some example embodiments, the alignment key that aligns the switch assembly on the first guide rail can comprise (i) a top portion, (ii) a bottom portion that extends out from the top portion, and (iii) a hook defined between the top portion and the bottom portion. In this regard, in some example embodiments, upon insertion of the alignment key into the key slot, the hook defined on the alignment key can be adapted to engage with a surface of the switch assembly.

In some example embodiments, the hook can comprise a cantilevered portion that can be adapted to snap fit through the key slot into the groove, thereby, abutting against a surface of the switch assembly.

According to some example embodiments, the divert unit of the conveyor can comprise (i) a divert track that can be positioned downstream of the switch assembly and (ii) an end plate that can be positioned downstream of the divert track.

In some example embodiments, the conveyor can further comprise a second guide rail assembly that can be configured to be positioned on a second portion of the conveyor frame along the conveyance direction of the conveyor. In this regard, the second guide rail assembly can comprise a third guide rail and a fourth guide rail, respectively. To this end, the fourth guide rail can be positioned parallel to the third guide rail. Further, in accordance with the example embodiments, the end plate of the divert unit can be configured to be mounted on the third guide rail and the fourth guide rail of the second guide rail assembly.

According to some example embodiments, the switch assembly can comprise at least one of: a switch plate, a bridge plate, and a divert plate. In this regard, in some examples, each of the switch plate, the bridge plate, and the divert plate can comprise a respective key slot adapted to receive a respective alignment key through one of a top surface or a bottom surface of the respective plates.

In some example embodiments the switch assembly can comprise a first plate and a second plate. The first plate and the second plate can be mounted on the first guide rail assembly. In this regard, the second plate can be aligned with the first plate based on an engagement of a first alignment key and a second alignment key into the groove defined in guide rails of the first guide rail assembly, through key slots defined on the first plate and the second plate, respectively.

According to some example embodiments, the switch assembly can be mounted on the first guide rail assembly based on a bolt that can be passed into the groove through an aperture defined on the switch assembly. Further, a nut can be fastened over the bolt, thereby fixedly mounting the switch assembly on the first guide rail assembly.

According to some example embodiments, the switch assembly can comprise a switch plate that can comprise a first key slot adapted to enable a first alignment key to pass through the first key slot and into the groove of the first guide rail thereby aligning the switch plate on the first guide rail. Further, the switch assembly can comprise a divert plate. The divert plate can comprise a second key slot adapted to enable a second alignment key to pass through the second key slot and into the groove of the first guide rail thereby aligning the divert plate on the first guide rail. Furthermore, the switch assembly can comprise a bridge plate positioned between the switch plate and the divert plate. In this regard, the bridge plate can comprise a third key slot adapted to enable a third alignment key to pass through the third key slot and into the groove of the first guide rail thereby aligning the bridge plate on the first guide rail.

According to some example embodiments the second guide rail can comprise a top portion and a bottom portion. In this regard, the top portion can define a channel adapted to receive a chain track of the conveyor. Further, the bottom portion can define a longitudinal groove that can be adapted to receive a second side of the switch assembly.

In some example embodiments, the switch assembly can be configured to be mounted on the first guide rail assembly based on a second side of the switch assembly to be positioned within the longitudinal groove of the second guide rail and the alignment key to be passed through the key slot on a second side of the switch assembly into the groove.

In some example embodiments, the switch assembly can be configured to slidably move along a length of the first guide rail assembly. In this regard, the second side of the switch assembly moves within the longitudinal groove of the second guide rail and first side of the switch assembly moves over the first guide rail.

In some example embodiments the divert unit can be slidably moved on the first guide rail assembly and the second guide rail assembly along a length of the conveyor.

Some example embodiments described herein relates to a divert unit of a sortation conveyor. The divert unit of the sortation conveyor can comprise a first guide rail assembly. The first guide rail assembly can be configured to be positioned on a first portion of a conveyor frame of the sortation conveyor such that rails of the first guide rail assembly extends along a length of the sortation conveyor. In this regard, the first guide rail assembly can comprise (i) a first guide rail that can define a groove along a length of the first guide rail assembly and (ii) a second guide rail that can be positioned parallel to the first guide rail. Further, the divert unit of the sortation conveyor can comprise a switch assembly. The switch assembly can comprise a switch plate that can define a key slot. The key slot can be adapted to enable an alignment key to pass through the key slot into the groove of the first guide rail, thereby, aligning the switch assembly on the first guide rail.

In some example embodiments, the second guide rail of the divert unit can comprise a top portion and a bottom portion. In this regard, the top portion can define a channel that can be adapted to receive a chain track of the sortation conveyor. Further, the bottom portion of the divert unit can define a longitudinal groove that can be adapted to receive a second side of the switch assembly.

According to some example embodiments the switch assembly of the divert unit can be configured to be slid ably move along a length of the first guide rail assembly so that a side of the switch assembly moves within the longitudinal groove of the second guide rail.

According to some example embodiments the divert unit can comprise a divert track and an end plate. In this regard, the divert track can be positioned downstream of the switch assembly and the end plate that can be positioned downstream of the divert track.

In accordance with some example embodiments the divert unit can further comprise a second guide rail assembly. The second guide rail assembly can be configured to be positioned on a second portion of the conveyor frame along the conveyance direction of the sortation conveyor. In this regard, the second guide rail assembly can comprise a third guide rail and a fourth guide rail that can be positioned parallel to the third guide rail. According to the example embodiments, the end plate of the divert unit can be configured to be mounted over the third guide rail and the fourth guide rail of the second guide rail assembly.

Some example embodiments described herein relates to a sortation conveyor to divert articles to a divert location. The sortation conveyor can comprise a conveyor frame having a first side frame, a second side frame, and a base frame. The base frame can be mounted between the first side frame and the second side frame. In some example embodiments, the sortation conveyor can also comprise a guide rail assembly. In this regard, the guide rail assembly can extend from one end of the conveyor frame to a second end of the conveyor frame along a length of the sortation conveyor and adapted to be mounted on a portion of the base frame. The guide rail assembly can comprise a first guide rail that can define a groove along a length of the first guide rail assembly and a second guide rail that can be positioned parallel to the first guide rail. Further, the guide rail assembly can comprise a switch assembly that can be mounted between the first guide rail and the second guide rail upon insertion of an alignment key into the groove of the first guide rail, through a key slot defined on the switch assembly.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Conveyors used in a material handling environment include a conveyor bed (for example, but not limited to, a roller conveyor bed, or a belt conveyor bed mounted between two sides of a conveyor frame, or a conveyor bed defined by a plurality of slats mounted over the conveyor frame) for conveying articles from one location to another location. Some of these conveyors are sortation conveyors (e.g., but not limited to, a shoe sorter) that can be configured for sorting articles based on selective diverting of the articles on the conveyor bed into respective divert lanes. Some of these shoe-based sortation conveyors include the conveyor bed defined by a plurality of slats configured to support lateral movement of pusher shoes. In this aspect, some shoe sortation conveyors include a divert unit having a divert guide path and a switch assembly that can be mounted upstream of the divert guide path on a conveyor frame of the sortation conveyor. The switch assembly of such sortation conveyors include a switch that can be moved between two positions (e.g. a first position or a second position) to selectively divert one or more pusher shoes from a home path to the divert guide path of the divert unit. The divert guide path referred herein usually includes an arcuate section that offers a path for movement of a pusher pin of the pusher shoe. To this end, the pusher shoe, upon movement through the divert guide path, can gently make a contact on an article conveyed on the conveyor bed, thereby guiding the article towards the divert lane. An example of such shoe sortation conveyor is described in U.S. patent application Ser. No. 12/014,822, entitled, "Sortation Conveyor", filed 16 Jan. 2008.

Usually, for installation of components of shoe sortation conveyor, mounting switch assembly on the conveyor frame of the sortation conveyor has associated challenges and limitations. For instance, in some examples, the switch assembly can be mounted on a portion of the conveyor frame (e.g. a side frame or on a spreader of the conveyor frame). In such cases, installation of the switch assembly often involves manual alignment of one or more plates of the switch assembly, at a desired position on the conveyor frame, which can be troublesome and time consuming. Also, if the plates of switch assembly are misaligned or mounted with an improper alignment on the conveyor frame, it may result in obstructed movement of the pusher shoe along a path defined by the switch assembly and further can even result in damaging any of the switch assembly, the pusher shoe, and/or other components of the sortation conveyor. Also, in some instances, it can be desired to install a divert unit (i.e. both switch assembly and the divert guide path) on the conveyor frame so that a distal end of the divert path aligns to a divert lane connected to the sortation conveyor. In such cases, to meet such installation requirements, sometimes, mounting the switch assembly on the conveyor frame becomes challenging due to interference caused by one or more components of the switch assembly with one or more spreaders of the conveyor frame. This often leads to re-designing the switch assembly (e.g. switch plate or divert plate) of the switch assembly or the divert unit (i.e. both the switch assembly and the divert guide path) itself to meet installation requirements as per a customer's material handling site. Accordingly, mounting the switch assembly on the conveyor frame has associated challenges.

Various example embodiments described herein relate to a conveyor that provides ease of installation of a divert unit on a conveyor frame of the conveyor. In this regard, according to some example embodiments, the conveyor described herein includes a guide rail assembly having multiple guide rails that support mounting of one or more components of the divert unit (e.g., but not limited to, switch assembly, divert track etc.). Said that, by way of implementation of various example embodiments described herein, installation of the divert unit on the conveyor can be easily customized so as to meet installation requirements of the customer's material handling environment. Further, some example embodiments described herein, also relate to an improved design of the switch assembly that can be installed on the conveyor frame of the sortation conveyor. In this regard, the switch assembly is designed and configured so as to, (a) avoid any interference of components of switch assembly (e.g. actuator unit) with spreaders of the conveyor frame, (b) enable self-alignment of one or more plates of the switch assembly during installation (e.g. mounting on the conveyor frame), and (c) selectively divert the pusher shoes thereby causing a desired impact (e.g. hard touch or soft touch) by a shoe face of the pusher shoe onto the articles.

According to some example embodiments described herein, "shoe sortation conveyor" can refer to a conveyor that can comprise one or more pusher shoes that can be configured to travel laterally (i.e. transverse to a longitudinal direction of travel of a conveyor surface of the conveyor) to divert articles carried by the conveyor surface of the conveyor to one or more divert locations associated with the conveyor. In this regard, in some examples, the pusher shoes can be guided along divert guide paths so as to gently engage and gradually accelerate conveyed articles laterally onto divert units mechanically coupled to the conveyor.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Figure 1:
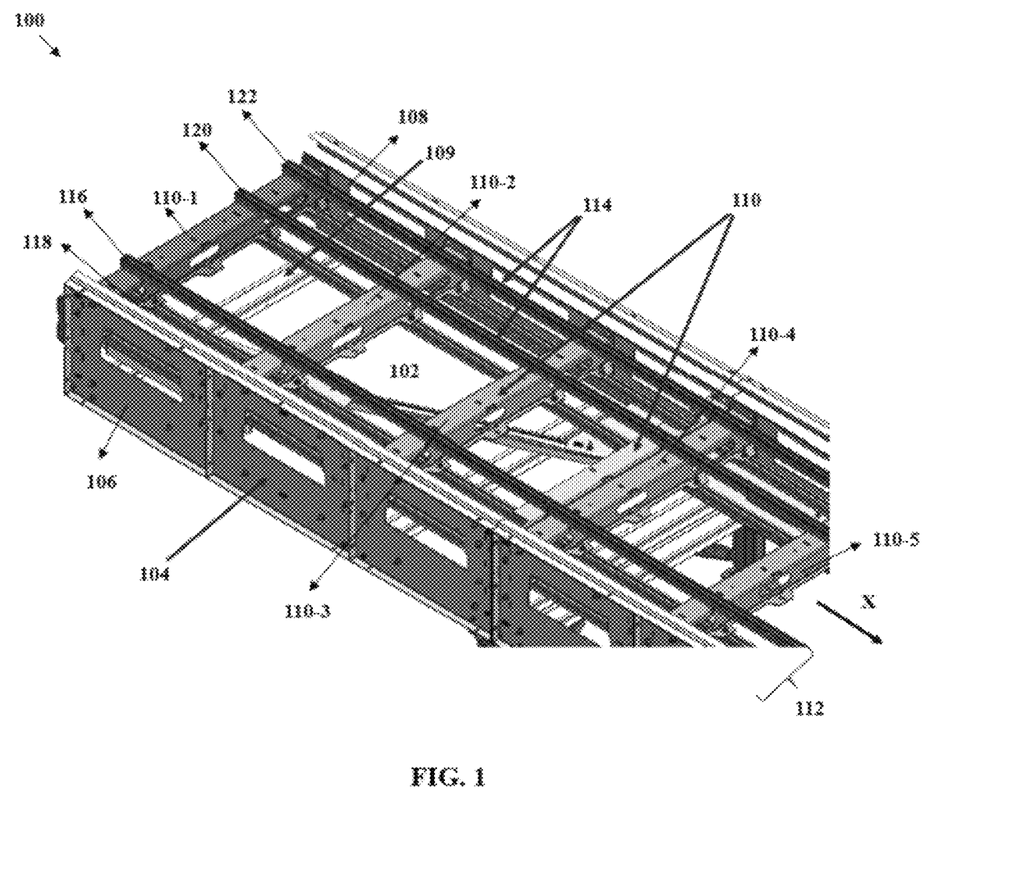
FIG. 1 illustrates a perspective view of a conveyor comprising a plurality of guide rails to support mounting of a switch assembly, in accordance with some example embodiments described herein.

FIG. 1 illustrates a perspective view 100 of a conveyor 102 of a material handling environment. According to some example embodiments, the conveyor 102 can correspond to a sortation conveyor, i.e. a conveyor configured for sorting one or more articles in the material handling environment. Illustratively, the conveyor 102 can comprise a conveyor frame 104. The conveyor frame 104 can be defined by a first side frame 106, a second side frame 108, a member 109 coupled to a base frame, and one or more spreaders 110-1, 110-2, 110-3, 110-4, 110-5 . . . 110-*n*. In this regard, the member 109 of the base frame can be mounted between the first side frame 106 and the second side frame 108. Further, as illustrated, the spreaders 110-1, 110-2, 110-3, 110-4, 110-5 . . . 110-*n* can be mounted over the member 109 of the base frame between the first side frame 106 and the second side frame 108.

Further, in accordance with some example embodiments described herein, the conveyor 102 can comprise one or more guide rail assemblies having guide rails e.g. metal extrusions that can run parallel along a length of the conveyor 102. Illustratively, the conveyor 102 can comprise a first guide rail assembly 112 and a second guide rail assembly 114 that can be positioned on the conveyor frame 104. The first guide rail assembly 112 can comprise a first guide rail 116 and a second guide rail 118. Further, the second guide rail assembly 114 can comprise a third guide rail 120 and a fourth guide rail 122. As illustrated, the second guide rail 118 can be positioned parallel to the first guide rail 116 on the conveyor frame 104 and the fourth guide rail 122 can be positioned parallel to the third guide rail 120 on the conveyor frame 104.

In accordance with some example embodiments, the guide rails assemblies 112 and 114 can be positioned on a first portion (e.g. on the spreaders 110) of the conveyor frame 104 such that the guide rails (116-122) can extend along a length of the conveyor in a direction X. Said differently, in some example embodiments, each of the first guide rail 116, the second guide rail 118, the third guide rail 120, and the fourth guide rail 122 can run substantially parallel to the side frames 106 and 108 along a length of the conveyor 102.

According to some example embodiments described herein, a plurality of guide rails (e.g. the guide rails 116-122) of the conveyor 102 can be configured to support mounting of one or more components of a divert unit (not shown) used for diverting articles from the conveyor 102. Furthermore, in accordance with some example embodiments, the one or more spreaders 110 (e.g., a first spreader 110-1, a second spreader 110-2, a third spreader 110-3, a fourth spreader 110-4, a fifth spreader 110-5 and so on) of the conveyor frame 104 can support mounting of the guide rail assemblies 112 and 114. Further details of the guide rail assemblies are described in reference to FIGS. 2-8 hereinafter.

Figure 2:
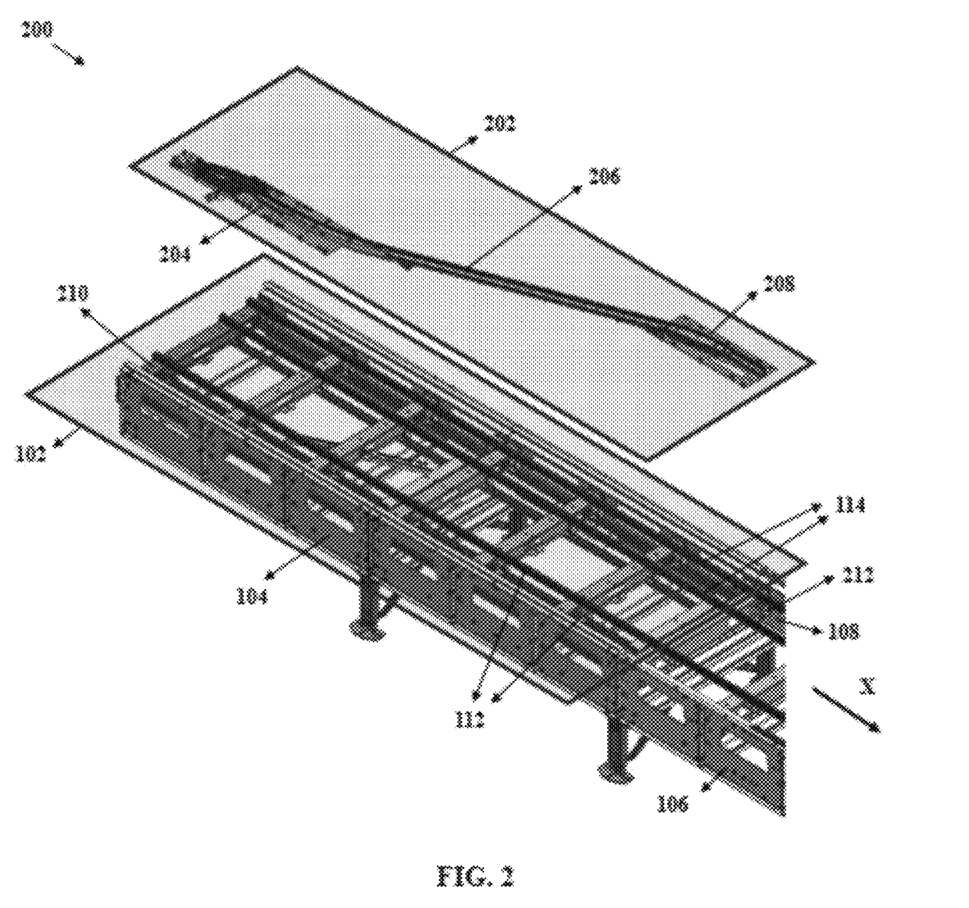
FIG. 2 illustrates a perspective view of the conveyor comprising the plurality of guide rails and a divert unit comprising the switch assembly, in accordance with some example embodiments described herein.

FIG. 2 illustrates a perspective view 200 of the conveyor 102 comprising the plurality of guide rails (116-122) and a divert unit 202. The divert unit 202 can comprise a switch assembly 204, in accordance with some example embodiments described herein. In accordance with some example embodiments, the divert unit 202 can be configured for diverting one or more articles from the conveyor 102 to a divert lane (not shown) associated with the conveyor 102. To this end, in accordance with some example embodiments, the divert unit 202 can comprise at least three components viz. (i) a switch assembly 204, (ii) a divert guide track 206 positioned downstream of the switch assembly 204, and (iii) an end plate 208 positioned downstream of the divert guide track 206. In accordance with various example embodiments, the divert unit 202 can be configured to cause movement of one or more pusher shoes (not shown) of the conveyor 102 to divert one or more articles on the sortation conveyor 102, details of which are described hereinafter. For instance, according to some example embodiments, the divert unit 202 can cause movement of the one or more pusher shoes of the conveyor 102 can be based on some techniques as described in U.S. patent application Ser. No. 12/014,822, entitled, "Sortation Conveyor", filed 16 Jan. 2008, details of which are incorporated herein by reference.

Illustratively, in accordance with various example embodiments described herein, the divert unit 202 can be mounted between two ends (e.g. a first end 210 and a second end 212) of the conveyor frame 104. In this regard, in some example embodiments, the divert unit 202 can be positioned over the conveyor frame 104 so that the switch assembly 204 of the divert unit 202 is positioned on the first guide rail assembly 112 i.e. towards the first end 210 and the end plate 208 of the divert unit 202 is positioned on the second guide rail assembly 114 i.e. towards the second end 212. Accordingly, the divert guide track 206 is positioned between the first guide rail assembly 112 and the second guide rail assembly 114. Said differently, in some example embodiments, upon placement of the divert unit 202 on the conveyor frame 104, the divert guide track 206 of the divert unit 20 connects the first guide rail assembly 112 to the second guide rail assembly 114 of the conveyor 102.

According to some example embodiments, upon positioning the divert unit 202 on the conveyor frame 104, various components of the divert unit 202 can be mounted on the conveyor frame 104. For example, the switch assembly 204 of the divert unit 202 can be mounted on the first guide rail assembly 112 and the end plate 208 of the divert unit 202 can be mounted on the second guide rail assembly 114, thereby mounting the divert unit 202 on the conveyor frame 104. Further details associated with mounting the various components of the divert unit 202 are described in FIGS. 3-8.

According to some example embodiments, before fixedly mounting the divert unit 202 on the conveyor frame 104, the divert unit 202 can be engaged on the guide rails assemblies 112 and 114 and can be slidably moved to a desired position along a length of the conveyor 102 (i.e. along the direction X). Said differently, in some example embodiments, the divert unit 202 can be moved in the direction X to adjust a position of the divert unit 202 relative to a divert lane/divert spur (not shown) connected with the sortation conveyor 102. For instance, in some example embodiments, the divert unit 202 can be slidably moved to a position on the guide rail assemblies 112 and 114 so that a distal end (i.e. an end of the endplate 208) of the divert unit 202 interfaces to an entry section of the divert lane (not shown) associated with the conveyor 102. In other words, the divert unit 202 can be slidably moved along a length of the conveyor 102, can be positioned upstream of the divert lane (not shown), and can subsequently be fixedly mounted on the guide rail assemblies 112 and 114 so that a portion of the divert unit 202 interfaces with the divert lane on the conveyor 102. Thus, in accordance with various example embodiments described herein, a movement of the divert unit 202 along a length of the conveyor 102 on the guide rail assemblies 112 and 114 is possible to adjust a position at which the switch assembly 204 and/or the endplate 208 can be to be fixedly engaged on the conveyor frame 104. In this regard, it may be understood that for positioning the divert lane and the divert unit 202 on the conveyor 102 consideration may also be given to layout of a material handling environment within which the conveyor 102 is to be installed.

In accordance with some example embodiments, movement of the divert unit 202 to a desired position on the conveyor frame 104 can be enabled based on slidable movement of the switch assembly 204 and the end plate 208 of the divert unit 202 within grooves defined by one or more the guide rails (116-122) of the guide rail assemblies 112 and 114, details of which are described hereinafter in reference to FIGS. 3-8.

Figure 3:
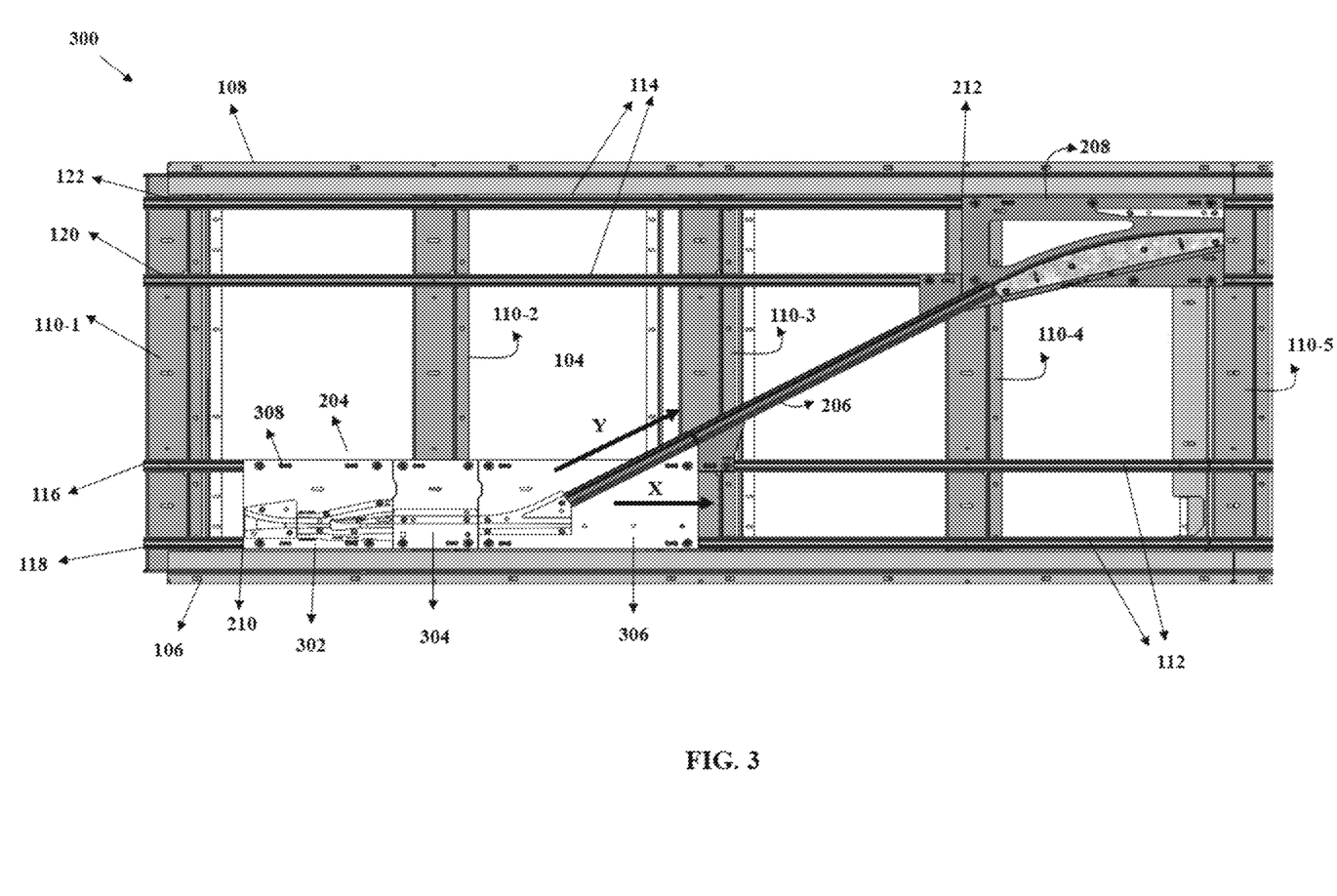
FIG. 3 illustrates a top view of the divert unit comprising the switch assembly mounted on a guide rail assembly of the conveyor, in accordance with some example embodiments described herein.

FIG. 3 illustrates a top view 300 of the divert unit 202 comprising the switch assembly 204 mounted on the guide rail assemblies 112 and 114 of the conveyor 102, in accordance with some example embodiments described herein. Illustratively, the divert unit 202 is mounted on the conveyor frame 104. In this regard, as illustrated, the switch assembly 204 can be configured to be mounted over the guide rails (i.e. the first guide rail 116 and the second guide rail 118) of the first guide rail assembly 112. Further, in some example embodiments, the endplate 208 of the divert unit 202 can be configured to be mounted on the guide rails (i.e. the third guide rail 120 and the fourth guide rail 122) of the second guide rail assembly 114. Accordingly, the divert guide track 206 can be positioned on the conveyor frame 104 between the guide rail assemblies 112 and 114.

In accordance with some example embodiments, the switch assembly 204 of the divert unit 202 can comprise, (i) a switch plate 302, (ii) a bridge plate 304, and (iii) a divert plate 306. As illustrated, the bridge plate 304 can be positioned between the switch plate 302 and the divert plate 306. To this end, the bridge plate 304 can be placed between the switch plate 302 and the divert plate 306 over the guide rails 116 and 118, so that one or more paths defined by the switch plate 302 and the divert plate 306 respectively, are joined by a path defined by the bridge plate 304 for movement of pusher shoes. In some example embodiments, the switch assembly can include two plates i.e. a first plate and a second plate (e.g. the switch plate 302 and the divert plate 306) and may not include the bridge plate. According to various example embodiments described herein, the plates (302-306) of the switch assembly 204 can be mounted on the guide rails (e.g. the first guide rail 116 and the second guide rail 118) of the first guide rail assembly 112.

Figure 4:
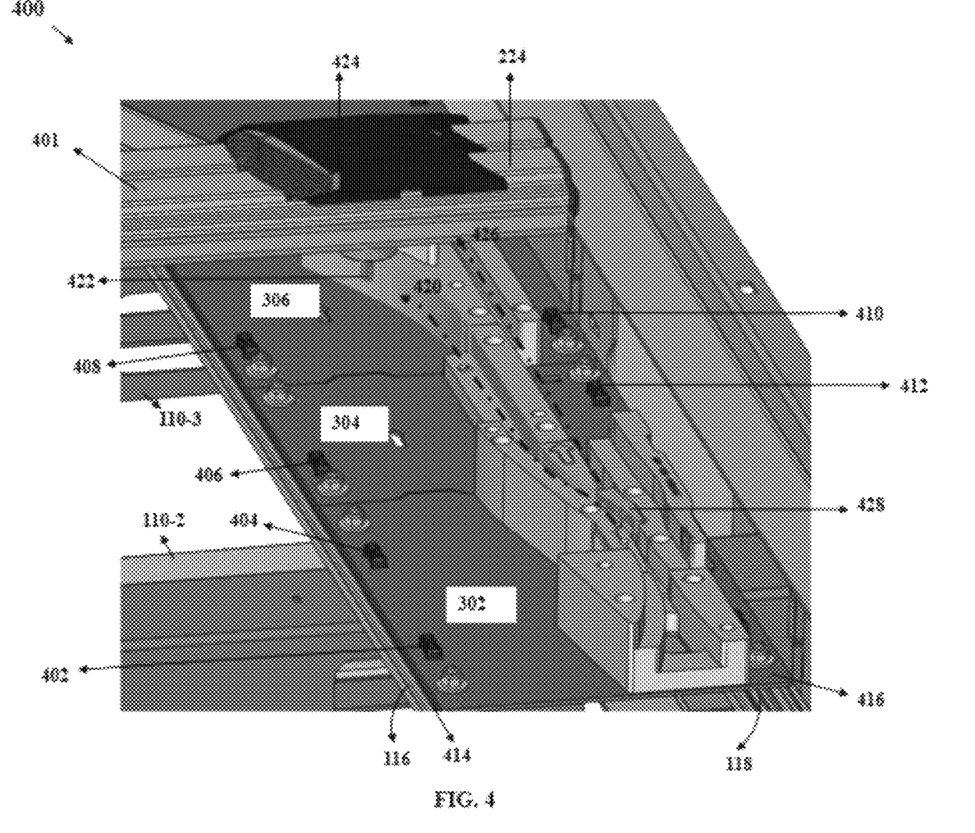
FIG. 4 illustrates a perspective view of the switch assembly mounted on the guide rail assembly using a plurality of alignment keys, in accordance with some example embodiments described herein.

According to various example embodiments described herein, the switch plate 302 can comprise a switch member (not shown), the bridge plate 304 can comprise a bridge member (not shown), and the divert plate 306 can comprise a divert member (not shown). In this regard, the switch member, the bridge member, and the divert member can define a switch guide path, a bridge guide path, and a divert guide path, respectively, for movement of a pusher pin of the pusher shoe within these paths and further to a divert track path defined by the divert guide track 206. To this end, paths defined by respective plates of the switch assembly 204 are illustrated in FIG. 4. Further, in accordance with some example embodiments described herein, the switch plate 302 can comprise a switch (not shown) that can be actuated by an actuator unit and can be moved between two positions (e.g. a first position or a second position) for selectively diverting the pusher shoe from a home path X to the divert guide path Y of the divert unit 202, further details of which would be described in reference to FIG. 4. As illustrated, while the switch plate 302 can be mounted on the guide rails 116 and 118 of the first guide rail assembly 112 between two adjacent spreaders (110-1 and 110-2). Further, the divert plate 306 can be mounted on the guide rails 116 and 118 between two adjacent spreaders (110-2 and 110-3). Furthermore, in some example embodiments, the bridge plate 304 can be mounted on the guide rails 116 and 118 over the spreader 110-2 of the conveyor frame 104. Mounting the bridge plate 304 over the spreader 110-2 can avoid interfering with one or more components of the switch plate 302 with the spreader 110-2.

According to various example embodiments described herein, the guide rail assemblies (112 and 114) can support mounting of one or more components (e.g., but not limited to, the switch assembly 204, the divert track 206, and the endplate 208) of the divert unit 202 on the conveyor 102. For instance, in some example embodiments, the switch plate 302, the bridge plate 304, and the divert plate 306 of the switch assembly 204 can be mounted on the guide rails 116 and 118 of the first guide rail assembly 112. To this end, these components can be mounted on the guide rails based on an engagement mechanism. Said that, in some example embodiments, the first guide rail assembly 112 can support mounting of the switch assembly 204 based on an engagement mechanism comprising an alignment key and a fastening mechanism (e.g. a bolt and nut). In this regard, in some examples, mounting one or more plates of the switch assembly 204 can include alignment of the plates with each other and/or on the guide rails 116 and 118 using alignment keys, more details of which are described in FIGS. 4-8.

Further, in accordance with some example embodiments described herein, the plates of the switch assembly 204 can comprise multiple key slots (not shown) that can be adapted to receive respective alignment keys. For instance, as illustrated, the switch plate 302 of the switch assembly 204 can include a key slot that enables an alignment key 308 to pass through the key slot and further into a groove defined by the first guide rail 116 of the first guide rail assembly 112. Insertion of alignment keys into respective key slots of the plates of the switch assembly 204 causes alignment of the plates and/or the switch assembly 204 on the first guide rail assembly 112. Accordingly, with regard to some example embodiments, each of the switch plate 302, the bridge plate 304, and the divert plate 306 can define a respective key slot that can be configured to receive a respective alignment key for aligning the plates (302-306) on the first guide rail assembly 112. Further, details of the alignment keys and engagement of the alignment keys into key slots of the plates of switch assembly 204 are described in reference to FIGS. 4-8.

FIG. 4 illustrates a perspective view 400 of the switch assembly 204 mounted on the first guide rail assembly 112 using a plurality of alignment keys (402-412), in accordance with some example embodiments described herein. Structural details of the alignment keys (402-412) are described in FIG. 7. Illustratively, the switch assembly 204 comprises multiple plates (e.g. the switch plate 302, the bridge plate 304, and the divert plate 306) positioned adjacent to each other. In this regard, in some examples, each plate (302-306) of the switch assembly 204 can be mounted on the first guide rail assembly 112 using an engagement mechanism, for instance, a pair comprising an alignment key and a nut and bolt assembly. To this end, in accordance with various example embodiments described herein, the switch plate 302 can comprise a first key slot (not shown) that can be adapted to enable a first alignment key 402 to pass through the first key slot and into a groove (not shown) of the first guide rail, thereby, aligning the switch plate 302 on the first guide rail 116. Additionally, in some example embodiments, the switch plate 302 can comprise another key slot that can be adapted to enable another alignment key 404 to pass through into the groove. Further, the divert plate 306 can comprise a second key slot (not shown) adapted to enable a second alignment key 408 to pass through the second key slot and into the groove of the first guide rail 116, thereby, aligning the divert plate 306 on the first guide rail assembly 112. Furthermore, the bridge plate 304 of the switch assembly 204 positioned between the switch plate 302 and the divert plate 306 can comprise a third key slot. In this regard, the third key slot can be adapted to enable a third alignment key 406 to pass through the third key slot and into the groove of the first guide rail 116, thereby, aligning the bridge plate on the first guide rail assembly 112. Insertion of alignment keys 402-408 also enables alignment of plates 302-306 to each other on the first guide rail assembly 112. In accordance with various example embodiments described herein, the alignment keys 402-408 can be passed through respective key slots on the plates 302-306 from any end i.e. from a top surface side of the plates 302-306 or from a bottom surface side of the plates 302-306. Said differently, the alignment keys 402-408 can be inserted from either side of the divert component plates and correctly serve its aligning function.

As illustrated, the switch assembly 204 can be mounted on the guide rails 116 and 118 of the first guide rail assembly 112 of the conveyor. In this regard, a first side 414 (e.g. a left side edge) of the switch assembly 204 can be positioned over the first guide rail 116 and a second side 416 (e.g. a right-side edge) of the switch assembly 204 can be received within the groove longitudinally defined by the second guide rail 118. Further details associated with engaging the alignment keys (402-412) in the grooves defined by the guide rails 116 and 118 of the first guide rail assembly 112 are described in reference to FIGS. 5-8.

According to some example embodiments described herein, the conveyor 102 described herein, may correspond to a slat shoe sortation conveyor comprising a plurality of slats (e.g. having a slat 401) that can be mounted between two side frames (e.g. the first side frame 106 and the second side frame 108) of the conveyor 102. In this regard, in accordance with some example embodiments, the plurality of slats (or transverse slats) of the sortation conveyor 102 can be typically arranged parallel to each other and perpendicular to a direction of travel of articles on the conveyor 102. In some examples, these transverse slats are typically carried at each end by a moving element, such as an endless chain track that can include alternately disposed extended pins which engage the slats, directly or indirectly to carry them. Said that, in accordance with some example embodiments, a plurality of pusher shoes of the sortation conveyor 102 can travel laterally (relative to the direction of travel of the sortation conveyor) about the slats to divert articles carried by an upper surface of the sortation conveyor 102 to divert spurs. To this end, the sortation conveyor 102 having the plurality of slates can correspond to sortation conveyor that can operate based on some techniques as described in U.S. patent application Ser. No. 10/409,749, entitled, "Sortation system, components and methods", filed 8 Apr. 2003, details of which are incorporated herein by reference.

Referring back to FIG. 4, the perspective view 400 also represents a movement of a pusher pin of a pusher shoe along a path defined by the switch assembly 204. It may be understood, that the pusher shoe referred herein, can correspond to an element that moves along a length of the slat laterally i.e. based on a movement of the pusher pin within the path defined by switch assembly 204 and further by the divert guide track 206. To this end, for purposes of brevity, the pusher shoe can be interchangeably referred or known as diverter, divert element, pusher, and pusher elements.

Illustratively, the plates (302-306) of the switch assembly 204 can define a plurality of paths for the movement of pusher pins of one or more pusher shoes of the conveyor 102. For instance, the switch assembly 204 can define a first path 420 for movement of a pusher pin 422 of a pusher shoe 424. In this regard, movement of the pusher pin 422 along the first path 420 can cause diversion of one or more articles on the conveyor 102 to a divert location (e.g. a divert lane connected to the sortation conveyor 102). Further, the switch assembly 204 also defines a second path 426 for the movement of the pusher pin 422 in case diverting of an article is not desired.

According to the example embodiments described herein, the first path 420 and the second path 426 can be defined based on connections of various sub-paths defined by members of the respective plates 302-306. Said differently, the sub-paths referred herein can be defined by plurality of members defined on the respective plates 302-306. In this regard, in accordance with some example embodiments described herein, the switch plate 302 can comprise a switch member, the bridge plate 304 can comprise a bridge member, and a divert plate can comprise a divert member defining respective sub-paths for movement of the pusher pin 422 of the pusher shoe 424. The switch member, bridge member, and the divert members mentioned herein, can correspond to structures defined by metal casted molds or molded elements that protrude outwards from a top surface the respective plates (302-306). As the switch plate 302, bridge plate 304, and divert plate 306 are positioned next to each other, a divert guide path defined by the divert plate 306 of the switch assembly 204 can be connected to the divert guide track 206 of the divert unit 202 positioned downstream of the switch assembly 204.

In accordance with some example embodiments, the switch plate 302 can also comprise a switch 428 that can be configured to be rotatably moved into a first position or to a second position on the switch member of the switch plate 302. In this regard, in some examples, in response to actuation, the switch 224 can be rotated to be moved to the first position so as to enable movement of the pusher pin 422 along the first path 420. Alternatively, in some examples, the switch 428 can be rotated to be moved to the second position, to enable movement of the pusher pin 422 into the second path 426. To this end, in some example embodiments, the pusher pin 422 of the pusher shoe 424 be initially housed (i.e. before an actuation) into a home position on the switch plate 302. However, in response to actuation, the pusher pin 422 can be moved onto the one or more paths defined by the switch assembly 204 to cause diverting of the articles from the sortation conveyor 102.

Figure 5:
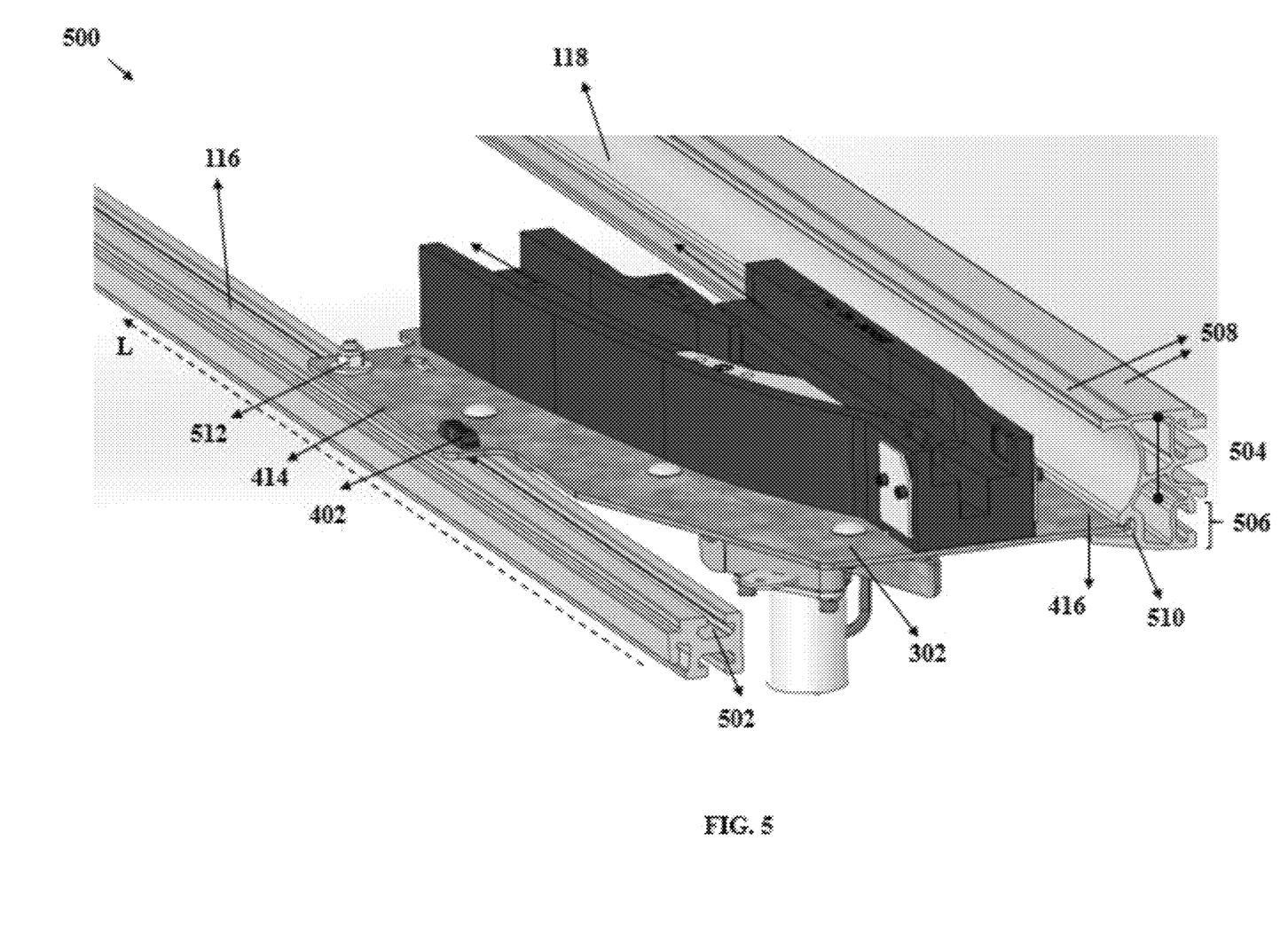
FIG. 5 illustrates a perspective view of the switch assembly mounted between a first guide rail and a second guide rail of the guide rail assembly, in accordance with some example embodiments described herein.

FIG. 5 illustrates a perspective view 500 of the switch plate 302 of the switch assembly 204 mounted between the first guide rail 116 and the second guide rail 118 of the first guide rail assembly 112, in accordance with some example embodiments described herein. In accordance with some example embodiments described herein, the guide rails (116-122) of the guide rail assemblies 112 and 114 can correspond to extrusions defined by a material such as aluminum. In other embodiments, other material, metals or composites may be used.

In accordance with some example embodiments, as illustrated, the first guide rail 116 can define a groove 502 along a length L of the first guide rail assembly 112. Further, the second guide rail 118 positioned parallel to the first guide rail 116 can comprise a top portion 504 and a bottom portion 506. In this regard, the top portion 504 can define a channel 508 that can be adapted to receive a chain track (not shown) of the conveyor 102. Further, the bottom portion 506 of the second guide rail 118 can define a longitudinal groove 510 along the length L of the first guide rail assembly 112.

Illustratively, the switch plate 302 comprises two sides i.e. the first side 414 and the second side 416. In this regard, the longitudinal groove 510 defined on the second guide rail 118 can be adapted to receive the second side 416 of the switch plate 302 of the switch assembly 204. Said that, the switch plate 302 can be positioned on the first guide rail assembly 112 so that the first side 414 of the switch plate 302 can be positioned over the first guide rail 116 and the second side 416 of the switch plate 302 can be received within the longitudinal groove 510 of the second guide rail 116. Further, the alignment key 402 can be passed through the key slot on the switch plate 302 into the groove 502, thereby aligning the switch plate 302 on the first guide rail assembly 112. Thus, the switch assembly 204 can be mounted on the first guide rail assembly 112 based on the second side 416 of the switch plate 302 to be positioned within the longitudinal groove 510 of the second guide rail 118 and the alignment key 402 to be passed through the key slot on the first side 414 of the first guide rail 116 into the groove 502 of the first guide rail 116.

In accordance with some example embodiments, the guide rails (116 and 118) of the first guide rail assembly 112 supports slidable movement of the switch assembly 204. In this regard, upon insertion of the alignment key 402 into the groove 502, the switch plate 302 can be slidably moved along a length of the first guide rail assembly 112. To this end, slidable movement of the switch plate 302 on the guide rails 116 and 118 of the first guide rail assembly 112 is based on movement of the second side 416 of the switch plate 302 within the longitudinal groove 510 of the second guide rail 118 and movement of the first side 414 of the switch plate 302 over a channel defined at top surface the first guide rail 116. Further, the switch plate 302 can be fixedly mounted on the guide rails 116 and 118 of the first guide rail assembly 112 based on fastening of a bolt and nut assembly 512 through the switch plate 302 into the groove 502.

Figure 6:
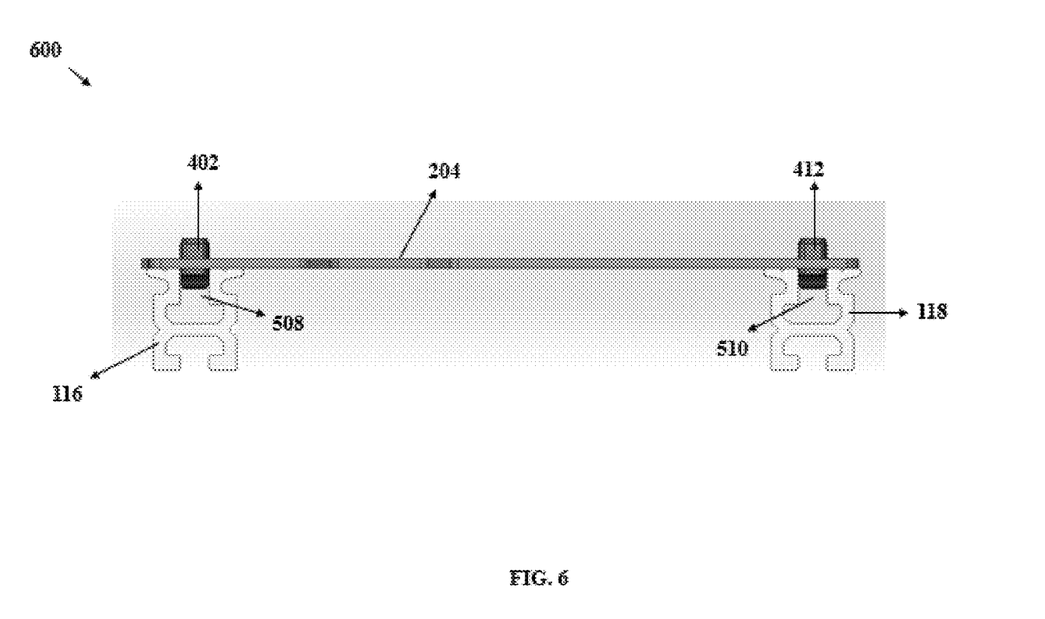
FIG. 6 illustrates a sectional view of the switch assembly mounted on the guide rail assembly using the plurality of alignment keys, in accordance with some example embodiments described herein.

FIG. 6 illustrates a sectional view 600 of the switch assembly 204 mounted on the guide rails 116 and 118 of the first guide rail assembly 112 using the plurality of alignment keys (402-412), in accordance with some example embodiments described herein. Illustratively, the alignment keys 402 and 412 are plugged through respective key slots on the switch plate 302 of the switch assembly 204, into the grooves 502 and 510 respectively defined by the guide rails 116 and 118.

Figure 7:
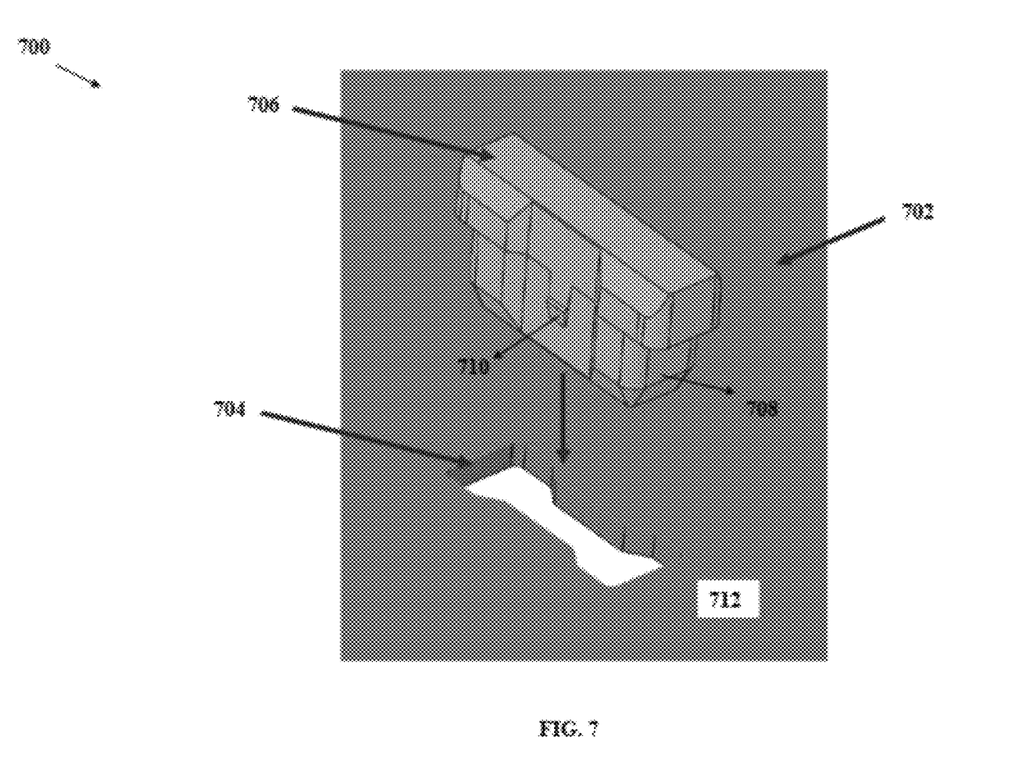
FIG. 7 illustrates a perspective view of an alignment key and a key slot defined on the switch assembly, in accordance with some example embodiments described herein.

FIG. 7 illustrates a perspective view 700 of an alignment key 702 and a key slot 704 defined on a plate (e.g. the switch plate 302) of the switch assembly 204, in accordance with some example embodiments described herein. Illustratively, the alignment key 702 can comprise a top portion 706, a bottom portion 708 that extends out from the top portion 706, and a hook 710 defined between the top portion 706 and the bottom portion 708. As illustrated, a periphery of an aperture defining the key slot 704 on a plate of the switch assembly 204 can be defined of a shape that can complement to a shape defined by the bottom portion 708 of the alignment key 702, thereby, allowing an insertion of the bottom portion 708 through the key slot 704.

Further, in some example embodiments, the hook 710 can be adapted to engage with a surface 712 of the switch assembly 204 upon insertion of the alignment key 702 into the key slot 704. In this regard, according to some example embodiments, the hook 710 can comprise an end defining a cantilevered portion that can be adapted to snap fit through the key slot 704 on the switch assembly 204 into the groove, thereby abutting against a surface 712 of the plate of the switch assembly 204. Said differently, the alignment key 702 when inserted into the groove 502 holds the switch plate 302 on the first guide rail assembly 112.

Figure 8:
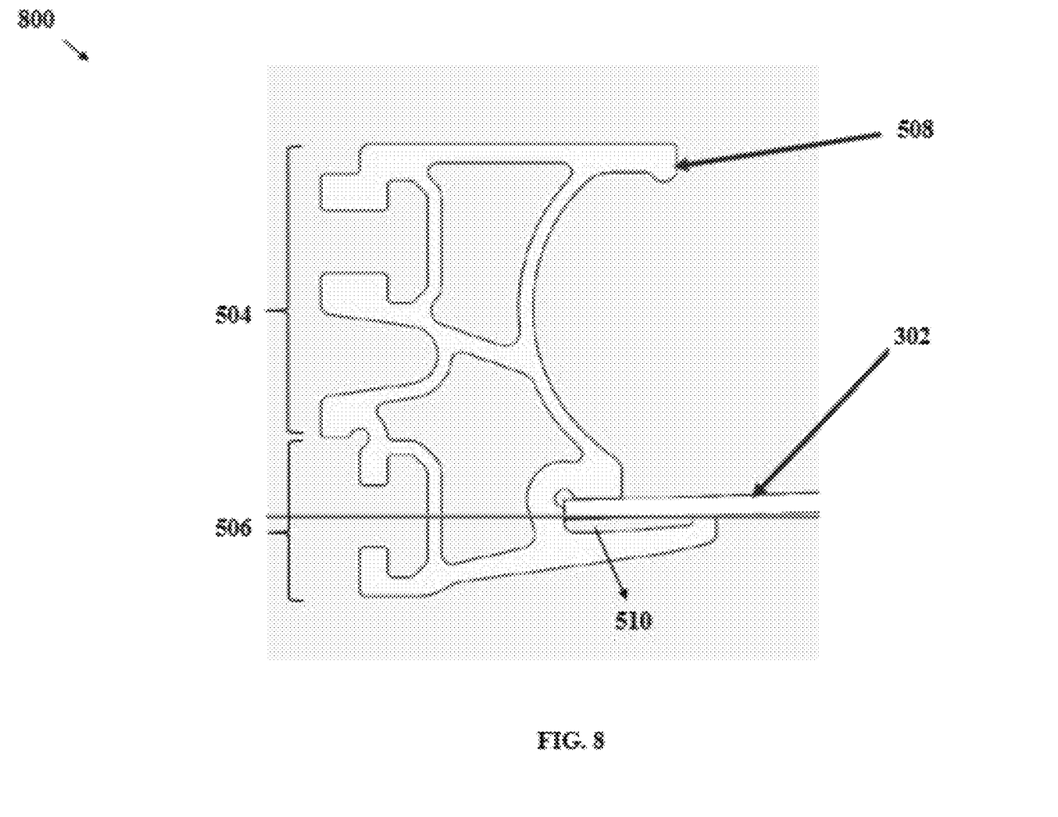
FIG. 8 illustrates a sectional view of the second guide rail of the guide rail assembly defining a longitudinal groove, in accordance with some example embodiments described herein.

FIG. 8 illustrates a sectional view 800 of the second guide rail 118 defining the longitudinal groove 510, in accordance with some example embodiments described herein. As illustrated, the second guide rail 118 defines two portions, i.e. the top portion 504 and the bottom portion 506. In this regard, as described before, the top portion 504 defines the channel 508 (i.e. an at the top surface of the second guide rail 118 that can be adapted to receive positioning of the chain track (not shown) connecting the plurality of slats of the conveyor 102. Further, as illustrated, the bottom portion 506 of the second guide rail 118 can define the longitudinal groove 510 that receives the switch plate 302 of the switch assembly 204. In accordance with various example embodiments described herein, the design of the rails of the first guide rail assembly 112 of the conveyor 102 is such that, one side of the plates (302-306) can be slid into the groove 510 of the second guide rail 118 and then the other side of the plates (302-306) can be fastened to the first guide rail 116 using the plurality of alignment keys (402-408) and fasteners. In this regard, a designed interference between the top of the plates (302-306) and the top of the rails 116 and 118 causes the plates (302-306) to be securely held in place. Said differently, the design of the guide rails 116 and 118 and the alignment keys (402-412) enables a component interference fit (also known as, a press fit or friction fit) i.e. which enables engagement of parts i.e. the alignment keys (402-412) within the grooves (502, 510) defined on the guide rails 116 and 118 achieved by friction after the parts are pushed together, rather than using a number of fasteners and nuts to hold the plates (302-306) on the conveyor 102, thereby reducing a hardware and installation cost.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A conveyor comprising:
 a conveyor frame;
 a first guide rail assembly configured to be positioned on a first portion of the conveyor frame such that rails of the first guide rail assembly extends along a length of the conveyor, the first guide rail assembly comprising:
  a first guide rail that defines a groove along a length of the first guide rail assembly; and
  a second guide rail positioned parallel to the first guide rail;
 an alignment key; and
 a divert unit comprising a switch assembly that defines a key slot adapted to enable the alignment key to pass through the key slot and into the groove of the first guide rail thereby aligning the switch assembly on the first guide rail.

2. The conveyor of claim 1, wherein the alignment key comprises:
a top portion;
a bottom portion that extends out from the top portion; and
a hook defined between the top portion and the bottom portion, wherein the hook is adapted to engage with a surface of the switch assembly upon insertion of the alignment key into the key slot.

3. The conveyor of claim 2, wherein the hook comprises a cantilever portion adapted to snap fit through the key slot on the switch assembly into the groove, thereby abutting against a surface of the switch assembly.

4. The conveyor of claim 1, wherein the divert unit further comprises:
a divert track positioned downstream of the switch assembly; and
an end plate positioned downstream of the divert track.

5. The conveyor of claim 4, further comprising a second guide rail assembly configured to be positioned on a second portion of the conveyor frame along a conveyance direction of the conveyor, the second guide rail assembly comprising:
a third guide rail; and
a fourth guide rail positioned parallel to the third guide rail, wherein the end plate of the divert unit is configured to be mounted on the third guide rail and the fourth guide rail of the second guide rail assembly.

6. The conveyor of claim 1, wherein the switch assembly comprises at least one of: a switch plate, a bridge plate, and a divert plate each comprising a respective key slot adapted to receive a respective alignment key through one of a top surface or a bottom surface of the respective plates.

7. The conveyor of claim 1, wherein the switch assembly comprises a first plate and a second plate mounted on the first guide rail assembly and wherein the second plate is aligned with the first plate based on engagement of a first alignment key and a second alignment key into the groove through key slots defined on the first plate and the second plate, respectively.

8. The conveyor of claim 1, wherein the switch assembly is mounted on the first guide rail assembly based on a bolt that is passed into the groove through an aperture defined on the switch assembly and wherein a nut is fastened over the bolt.

9. The conveyor of claim 1, wherein the switch assembly comprises:
a switch plate comprising:
a first key slot adapted to enable a first alignment key to pass through the first key slot and into the groove of the first guide rail thereby aligning the switch plate on the first guide rail;
a divert plate comprising:
a second key slot adapted to enable a second alignment key to pass through the second key slot and into the groove of the first guide rail thereby aligning the divert plate on the first guide rail; and
a bridge plate positioned between the switch plate and the divert plate, the bridge plate comprising:
a third key slot adapted to enable a third alignment key to pass through the third key slot and into the groove of the first guide rail thereby aligning the bridge plate on the first guide rail.

10. The conveyor of claim 1, wherein the second guide rail comprises:
a top portion that defines a channel adapted to receive a chain track of the conveyor; and
a bottom portion that defines a longitudinal groove adapted to receive a second side of the switch assembly.

11. The conveyor of claim 10, wherein the switch assembly is configured to be mounted on the first guide rail assembly based on the second side of the switch assembly to be positioned within the longitudinal groove of the second guide rail and the alignment key to be passed through the key slot on a first side of the first guide rail into the groove.

12. The conveyor of claim 10, wherein the switch assembly is configured to slidably move within the longitudinal groove and along a length of the first guide rail assembly.

13. The conveyor of claim 5, wherein the divert unit can be slidably moved on the first guide rail assembly and the second guide rail assembly along a length of the conveyor.

14. A divert unit of a sortation conveyor comprising:
a first guide rail assembly configured to be positioned on a first portion of a conveyor frame of the sortation conveyor such that rails of the first guide rail assembly extends along a length of the sortation conveyor, the first guide rail assembly comprising:
a first guide rail that defines a groove along a length of the first guide rail assembly; and
a second guide rail positioned parallel to the first guide rail;
a switch assembly comprising a switch plate that defines a key slot adapted to enable an alignment key to pass through the key slot and into the groove of the first guide rail thereby aligning the switch assembly on the first guide rail.

15. The divert unit of claim 14, wherein the second guide rail comprises:
a top portion that defines a channel adapted to receive a chain track of the sortation conveyor; and
a bottom portion that defines a longitudinal groove adapted to receive a second side of the switch assembly.

16. The divert unit of claim 15 wherein the switch assembly is configured to slidably move within the longitudinal groove along a length of the first guide rail assembly.

17. The divert unit of claim 14 further comprising, the alignment key comprising:
a top portion;
a bottom portion that extends out from the top portion; and
a hook defined between the top portion and the bottom portion, wherein the hook comprises a cantilevered portion adapted snap fit into the key slot and the groove defined by the first guide rail.

18. The divert unit of claim 14 further comprising:
a divert track positioned downstream of the switch assembly; and
an end plate positioned downstream of the divert track.

19. The divert unit of claim 18 further comprising:
a second guide rail assembly configured to be positioned on a second portion of the conveyor frame along a conveyance direction of the sortation conveyor, the second guide rail assembly comprising:
a third guide rail; and
a fourth guide rail positioned parallel to the third guide rail, wherein the end plate of the divert unit is configured to be mounted over the third guide rail and fourth guide rail of the second guide rail assembly.

20. A sortation conveyor to divert articles to a divert location, the sortation conveyor comprising:
a conveyor frame comprising:
a first side frame;
a second side frame; and a base frame mounted between the first side frame and the second side frame;

a guide rail assembly that extends from one end of the conveyor frame to a second end of the conveyor frame along a length of the sortation conveyor and adapted to be mounted on a portion of the base frame, the guide rail assembly comprising:

a first guide rail that defines a groove along a length of the guide rail assembly; and a second guide rail positioned parallel to the first guide rail;

a switch assembly mounted between the first guide rail and the second guide rail upon insertion of an alignment key into the groove of the first guide rail, through a key slot defined on the switch assembly.

* * * * *